US011014209B2

(12) United States Patent
Garcia et al.

(10) Patent No.: US 11,014,209 B2
(45) Date of Patent: May 25, 2021

(54) DUST EXTRACTOR

(71) Applicant: Black & Decker Inc., New Britain, CT (US)

(72) Inventors: Pablo Garcia, Wiesbaden (DE); Arthur Lauer, Frankfurt (DE); Stefan Sell, Mainz (DE)

(73) Assignee: Black & Decker Inc., New Britain, CT (US)

( * ) Notice: Subject to any disclaimer, the term of this patent is extended or adjusted under 35 U.S.C. 154(b) by 233 days.

(21) Appl. No.: 16/154,162

(22) Filed: Oct. 8, 2018

(65) Prior Publication Data

US 2019/0111532 A1    Apr. 18, 2019

(30) Foreign Application Priority Data

Oct. 12, 2017    (GB) ...................... 1716738

(51) Int. Cl.
*B23Q 11/00* (2006.01)
*B25F 5/02* (2006.01)

(52) U.S. Cl.
CPC ...... *B23Q 11/0046* (2013.01); *B23Q 11/0071* (2013.01); *B25F 5/021* (2013.01)

(58) Field of Classification Search
CPC .... B23Q 11/0046; B23Q 11/0071; B25F 5/02
USPC ....................................................... 173/198
See application file for complete search history.

(56) References Cited

U.S. PATENT DOCUMENTS

| 8,424,615 B2 | 4/2013 | Baumann et al. |
| 9,505,095 B2 * | 11/2016 | Machida ................... B25F 5/02 |
| 10,603,753 B2 * | 3/2020 | Lauer ................. B23Q 11/0046 |

FOREIGN PATENT DOCUMENTS

| EP | 1245330 | 10/2002 |
| EP | 1459841 A1 * | 9/2004 | ......... B23Q 11/0046 |
| EP | 3135429 | 3/2017 |
| WO | 2008003544 | 1/2010 |

OTHER PUBLICATIONS

EP ESSR dated, Mar. 19, 2019, filed in corresponding EP application 18198545.8.

* cited by examiner

*Primary Examiner* — Michelle Lopez
(74) *Attorney, Agent, or Firm* — Amir Rohani

(57) ABSTRACT

An adaptor for a dust extractor is provided including a housing having a top portion and a bottom portion, a first aperture formed in the top portion of the housing, a second aperture formed in the bottom portion of the housing, and an adaptor catch having a first end and a second end. The adaptor catch is vertically slidable within the housing between a first catch position, where the first end projects through the first aperture, and a second catch position, where the first end is located flush with or inside of the housing. The second end of the adaptor catch is accessible through the second aperture. A first biasing mechanism biases the adaptor catch towards the second catch position.

18 Claims, 12 Drawing Sheets

DUST EXTRACTOR

CROSS-REFERENCE TO RELATED APPLICATIONS

This application claims priority, under 35 U.S.C. § 119, to GB Patent Application No. 1716738.8, filed Oct. 12, 2017, titled "Dust Extractor", content of which is incorporated herein by reference in entirety.

FIELD

The present invention relates to a dust extractor for a drill, and in particular, for a hammer drill, and an adaptor for use with such a dust extractor, and the combination of a dust extractor, a drill and an adaptor

BACKGROUND

One type of drill is a hammer drill which typically comprises an electric motor, a hammer mechanism and/or a rotary drive. The hammer drill is powered ether by an AC mains electric power supply or a battery attached to the hammer drill. A cutting tool, such as a drill bit, is supported within a tool holder mounted on the front of the hammer drill which is driven by the motor via either the rotary drive or the hammer mechanism or both to perform cutting operations. Such a hammer drill usually can operate in a hammer only mode, a drill only mode or a hammer and drill mode.

EP1157788 describes a typical example of hammer drill.

During the operation of a hammer drill, a large amount of dust can be generated. In addition to making the local vicinity dirty and clogging up the hammer drill, it can also be a health hazard to the operator of the hammer drill as the operator may breathe in the dust. As such it is desirable to collect the dust so that it can be safely disposed off.

One way of achieving this is by the use of a dust extractor. EP1245330 discloses an example of a dust extractor.

Dust extractors are attached to the body of a hammer drill. The dust extractor comprises a main body and a shroud, typically mounted on the end of a tubular telescopic arm which is attached to the main body, and which surrounds the cutting tool and engages with the work piece being cut. The dust extractor comprises a dust collection box, a filter mounted within the dust collection box and an air suction device. Whilst the hammer drill is in use, the air suction device is switched on. During use, the dust generated by the cutting tool cutting the work piece enters the shroud. The air suction device draws the air together with dust from within shroud, through the telescopic arm into the dust collection box. The air passes then through the filter, whilst the dust is trapped by the filter within the dust collection box. The clean air is then typically expelled from the dust extractor. Once the operation of the hammer is complete, the dust extraction box can be removed from the dust extractor and the dust removed from the dust collection box and safely disposed of.

In some designs dust extractors, the air suction device can be located remotely from the body. For example, the cooling fan of the electric motor of the hammer drill can be used as the air suction device and generate an air vacuum source which connects to the main body of the dust extractor. The air is drawn through the filter, out of the main body of the dust extractor and then into the housing of the hammer drill where it passes through the cooling fan of the hammer drill.

In alternative designs, a fan is rotatable mounted within the main body of the dust extractor adjacent the filter. The fan is rotatably driven by a motor to generate an air vacuum source and draw air from the shroud into the dust collection box and then through the filter before expelling it from the main housing. The fan can be rotatably driven by an electric motor mounted within the main housing of the dust extractor. Alternatively, the fan can be releasably attached to the spindle of the drive motor of the hammer drill. DE4024022 discloses such a dust extractor.

A problem associated with existing designs of dust extractor is that each particular design of dust extractor is intended to be used with only one specific design of hammer drill.

SUMMARY

According to an embodiment, there is provided an adaptor for a dust extractor including a housing having a top portion and a bottom portion; a first aperture formed in the top portion of the housing; a second aperture formed in the bottom portion of the housing; and an adaptor catch having a first end and a second end. The adaptor catch is vertically slidable within the housing between a first catch position, where the first end projects through the first aperture, and a second catch position, where the first end is located flush with or inside of the housing, the second end of the adaptor catch being accessible through the second aperture. A first biasing mechanism is arranged to bias the adaptor catch towards the second catch position.

An embodiment of the invention will now be described with reference to the accompanying drawings.

BRIEF DESCRIPTION OF THE DRAWINGS

Two embodiments of the present invention will now be described with reference to the accompanying drawings of which.

DETAILED DESCRIPTION

Figure 1:
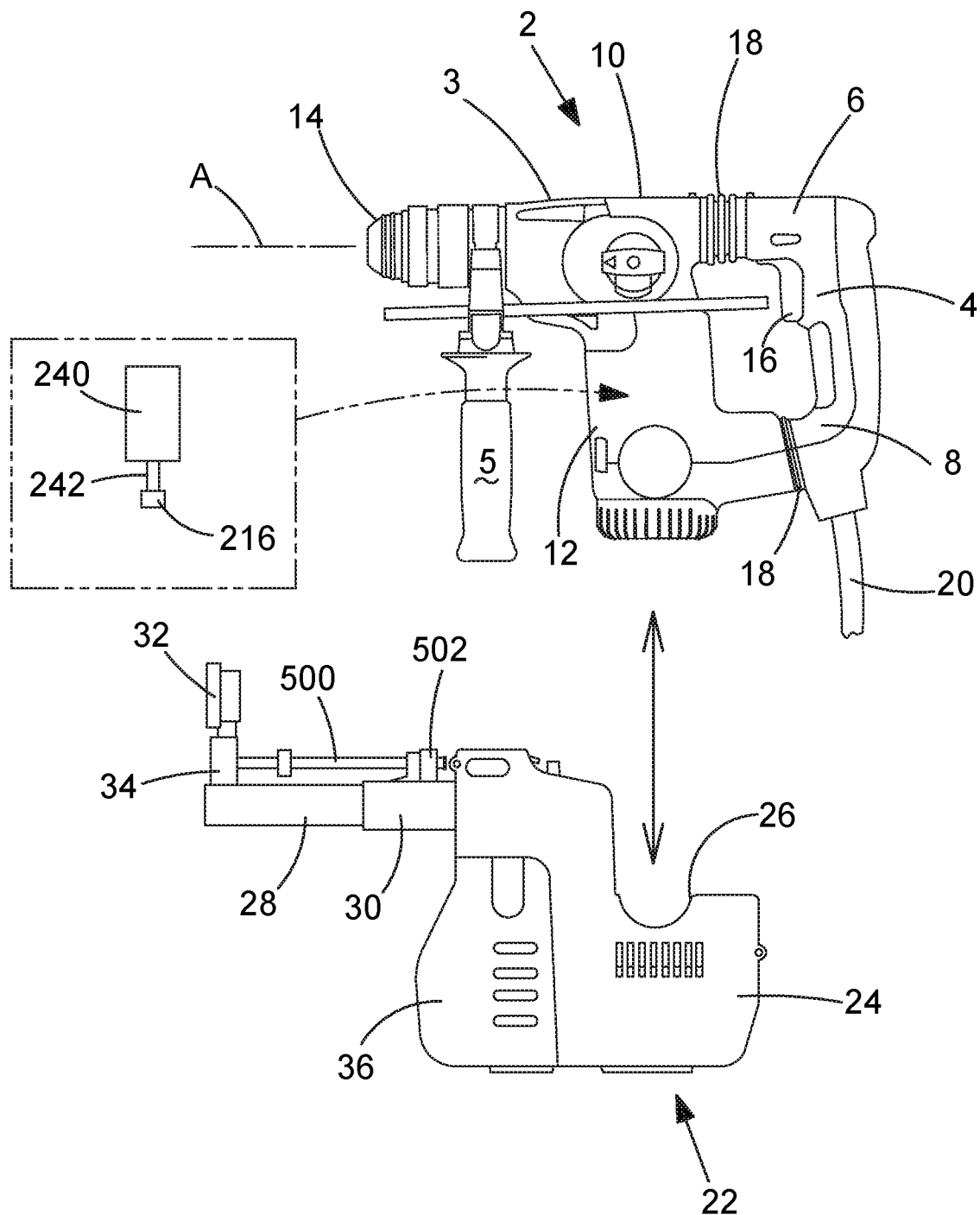
FIG. 1 shows a side view of a known design of hammer drill and known design of dust extractor.
Figure 2:
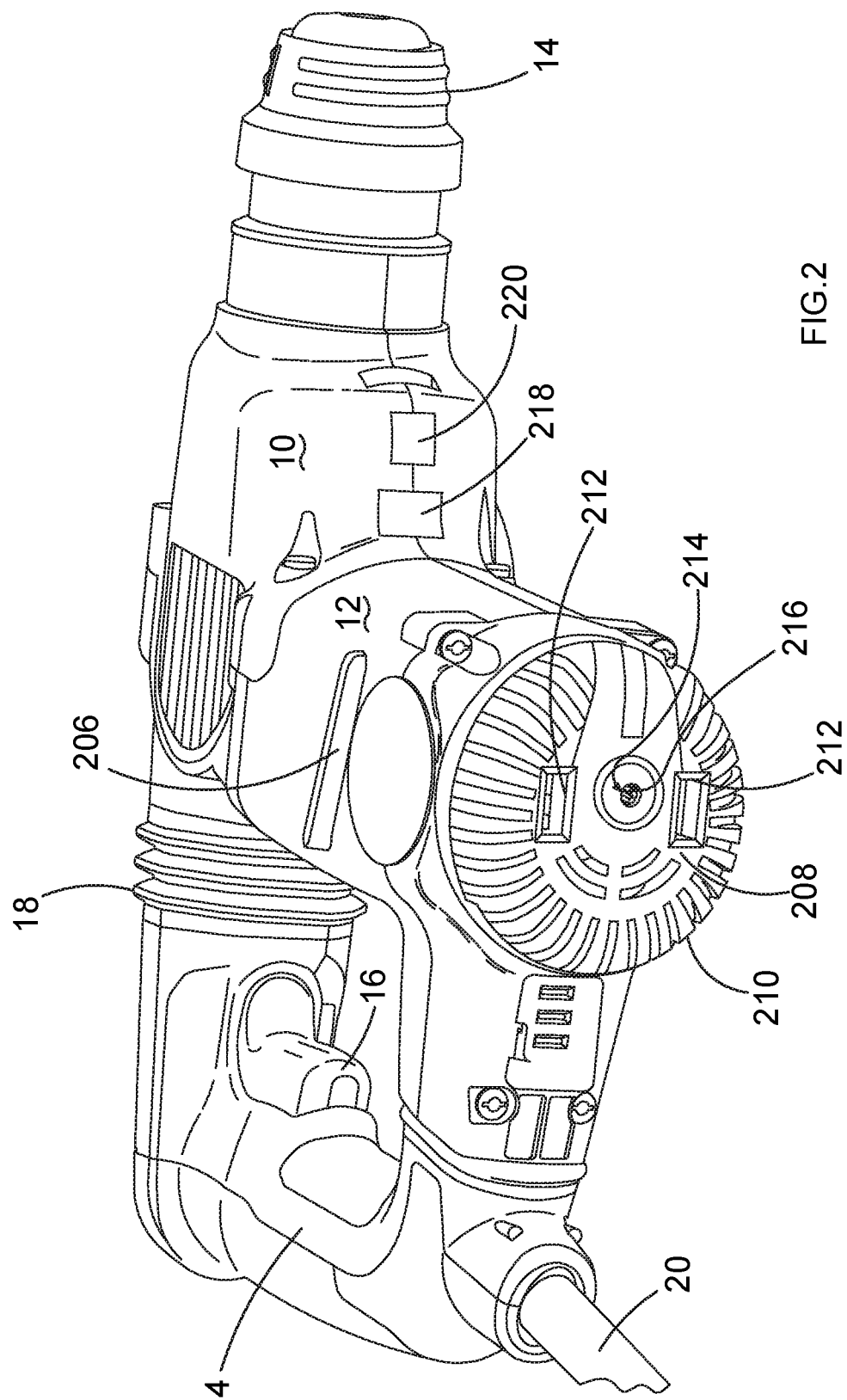
FIG. 2 shows a lower perspective view of the hammer drill used with a dust extractor in accordance with another example of dust extractor.

Referring to FIG. 1, a hammer drill comprises a main housing 2 and a rear handle 4 attached to the main housing 2 via vibration dampeners 18 at its upper 6 and lower 8 ends. The main housing 2 comprises a motor housing 12, in which is mounted an electric motor 240 having an output spindle 242 and a transmission housing 10, in which is mounted the hammer mechanism (not shown) and rotary drive (not shown). A mode change knob 3 is used to change the mode of operation of the hammer drill. A tool holder 14 is mounted on the front of the transmission housing 10 which is capably of releasably holding a cutting tool (not shown). The tool holder is cable of being rotated about axis A. A front handle is attached to the transmission housing 10 behind the tool holder 14. A trigger switch 16 is mounted within the rear handle 4 by which an operator can activate the hammer drill. An electric cable 20 connects to the base of the rear handle 4 by which a mains AC electric power supply is supplied to the hammer drill.

A typical dust extractor comprises a main housing 22 manufactured from two plastic clam shells 24, 26 which are joined together about a vertical plane using screws. Mounted on the top of the main housing is a telescopic tubular extension arm 28, 30. A first section 28 of the telescopic arm 30 can slide in and out of the other second section 30. A spring (not shown) biases the first section 28 out of the second section towards its maximum extended position.

Mounted on the end of the first section 28 remote from the main housing is a tubular support 34 and a shroud 32. A hole is formed through the shroud 32 to allow a cutting tool to pass through the shroud 32.

A dust collection box 36 releasably connects to the front of the main housing 22. A filter (not shown) is mounted within the box 36.

Another example of a dust extractor will now be described with reference to FIGS. 2 to 7. Where the same features are use in the embodiment that used in the example described with reference to FIG. 1, the same reference numbers have been used.

Figure 3:
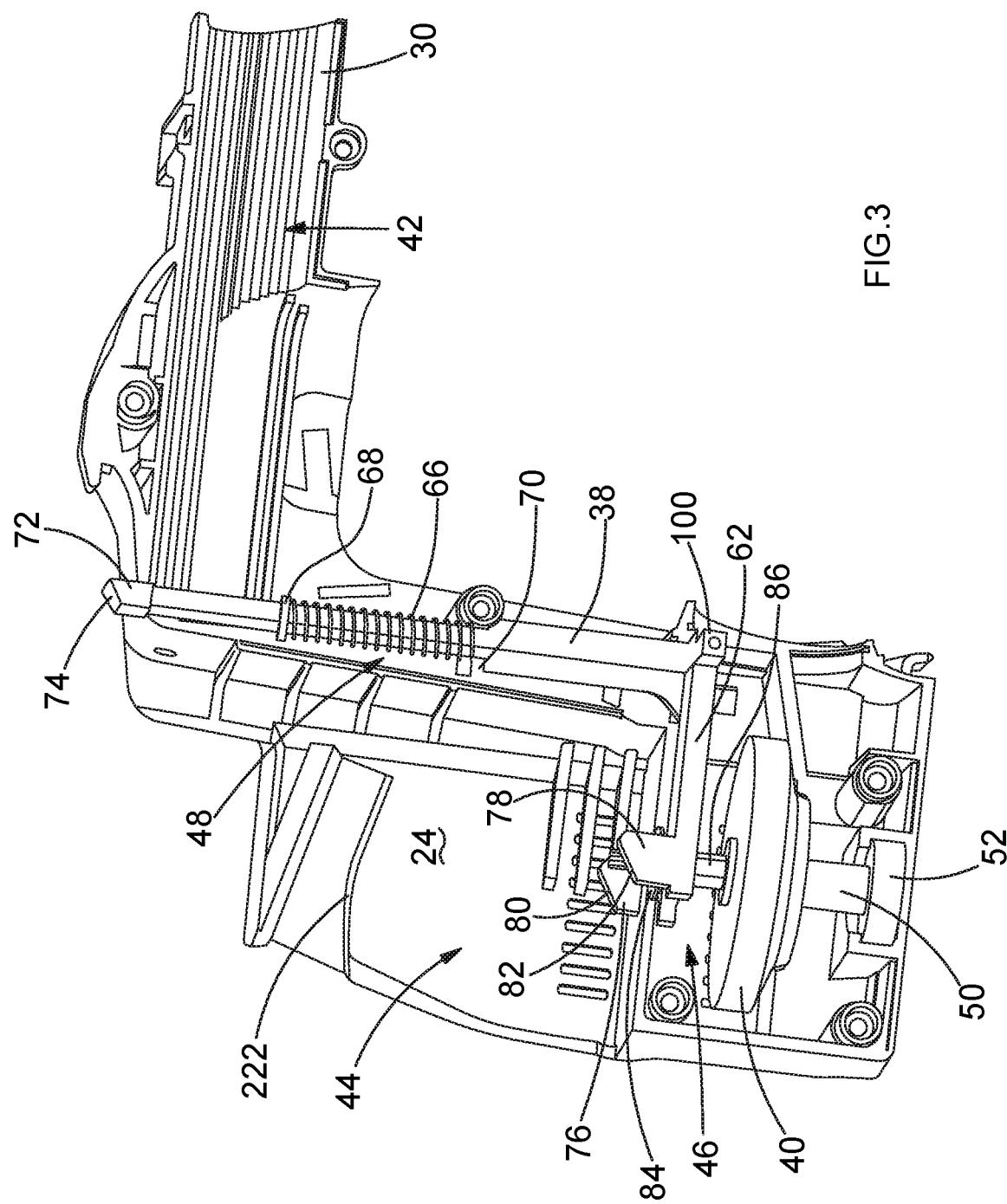
FIG. 3 shows a side view of one of the clam shells of the main housing of the dust extractor in accordance with the embodiment of the present invention with a latch mechanism and a fan wheel.
Figure 4:
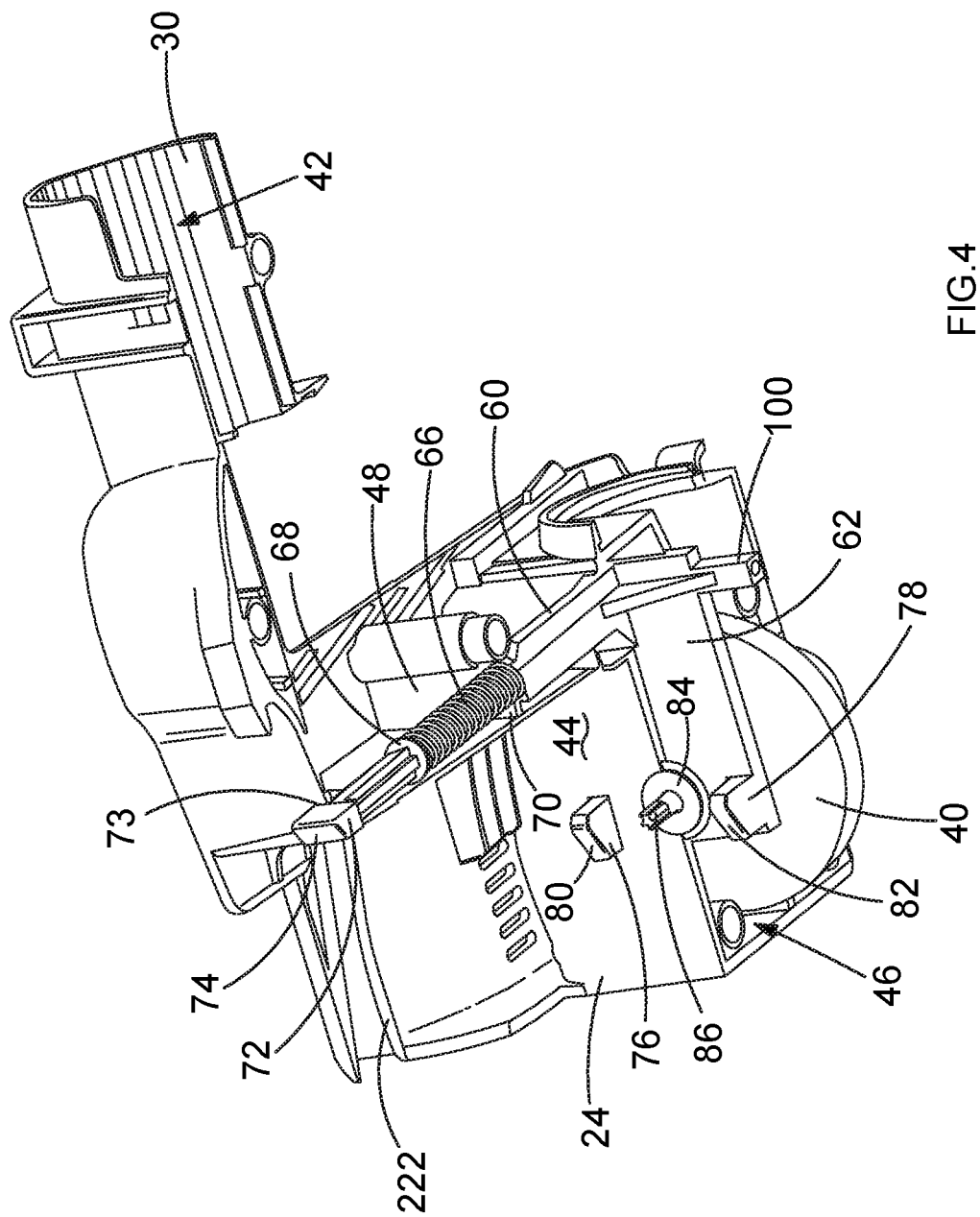
FIG. 4 shows a perspective view of one of the clam shells of the main housing of the dust extractor with latch mechanism and fan wheel.
Figure 5:
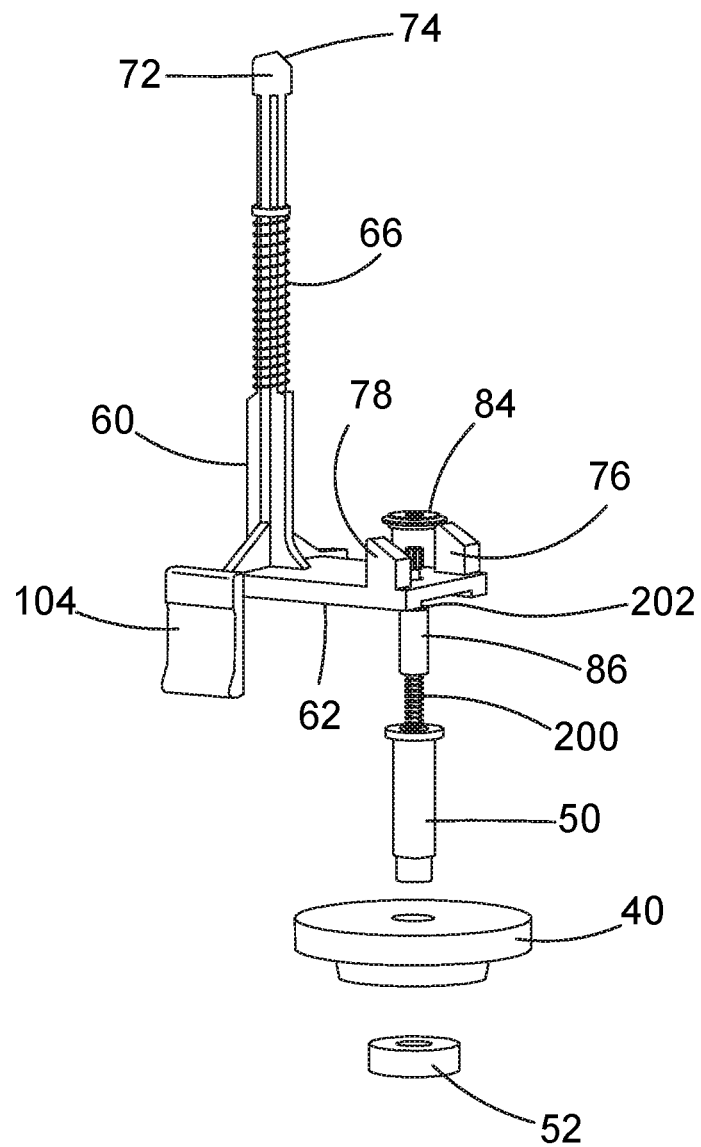
FIG. 5 shows an exploded view of the latch mechanism.
Figure 6:
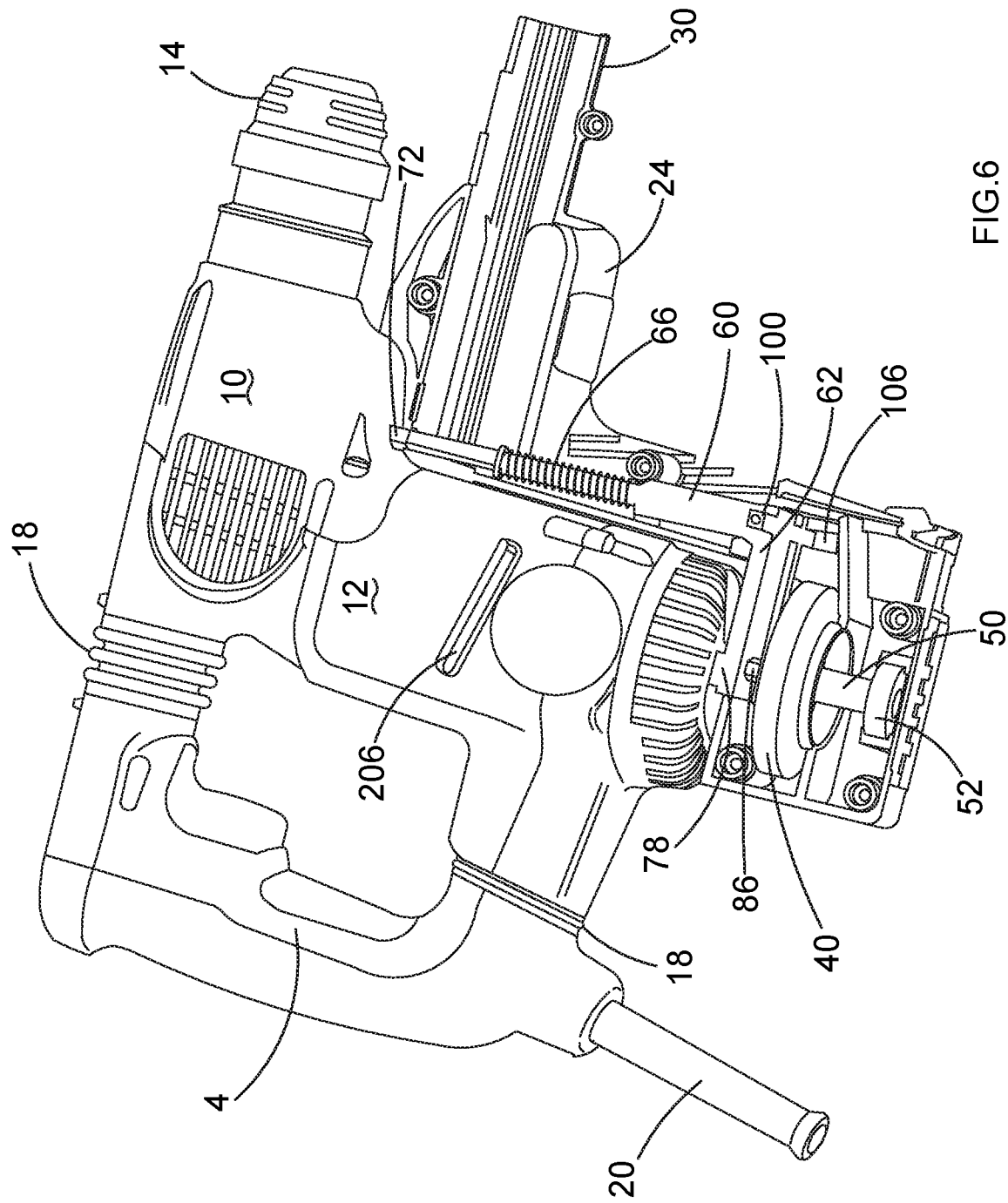
FIG. 6 shows a side view of one of the clam shells of the main housing of the dust extractor with latch mechanism and fan wheel attached to the hammer drill from a first side.
Figure 7:
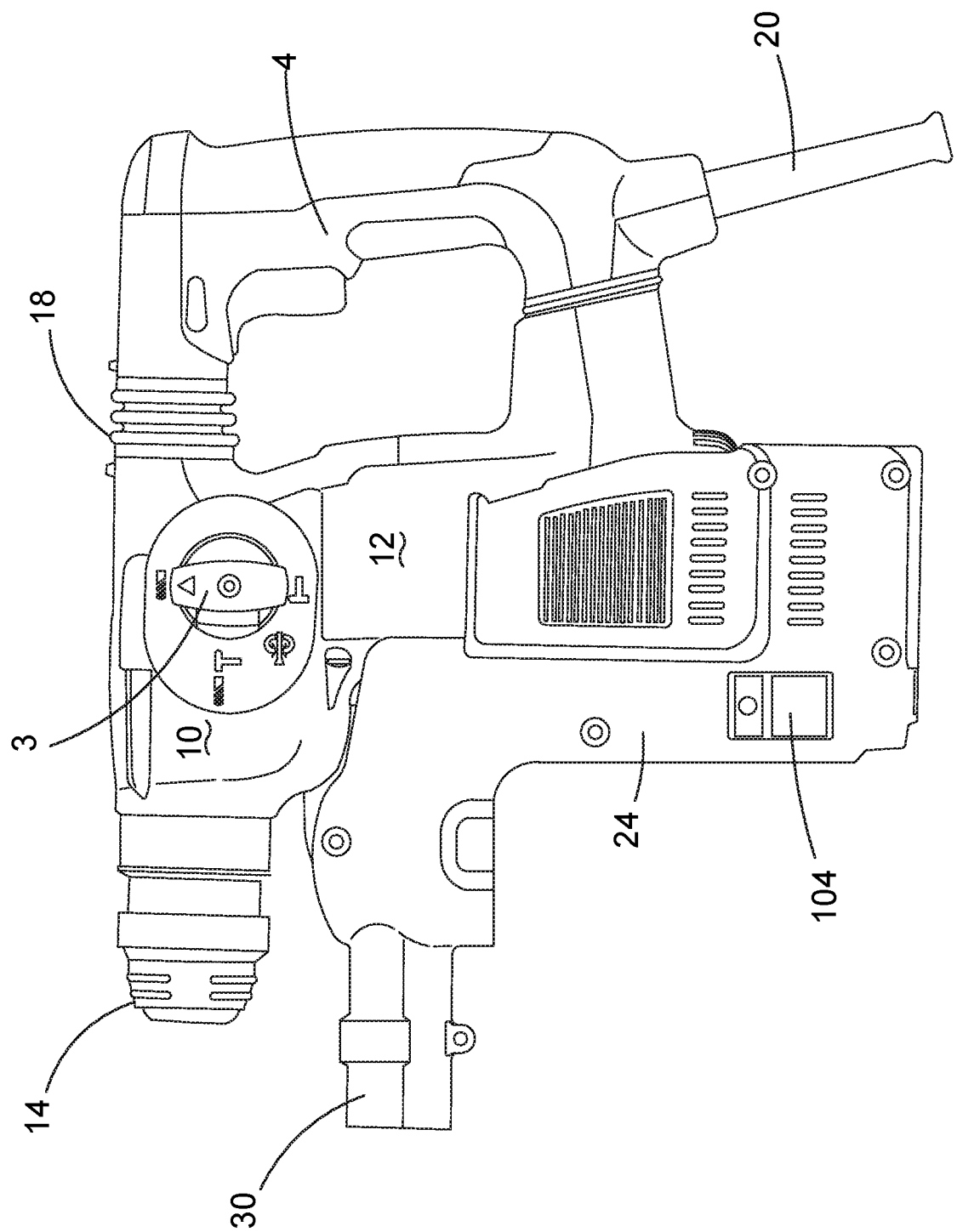
FIG. 7 shows a side view of the clam shell of FIG. 6 attached to the hammer drill from the other side.

Referring to FIG. 3 which shows a side view of one of the clam shells 24 of the main housing of the dust extractor with a latch mechanism 38 and fan wheel 40. The main housing is formed in four sections 42, 44, 46, 48. The first section 42 forms the second section 30 of the telescopic arm. The second section 44 forms a recess into which a part of the motor housing 12 of the hammer drill can slide in order for it to be attached to the dust extractor. The third section 46 forms a fan housing for the fan wheel 40. The fourth section 48 provides a chamber in which the latch mechanism 38 is slideably mounted within the main housing.

The fan wheel 40 is rigidly mounted on a tubular spindle 50 which is rotatably mounted in bearing 52 attached to the base wall of the third section 46. The fan 40 acts as a radial fan when rotationally driven.

The latch mechanism 38 comprises a horizontal plate 62 connected to one side of which is a vertical elongate rod 60. The elongate rod 60 is slideably mounted within the fourth section 48 of the main housing and can slide over a limited rand of movement along its longitudinal axis 64. A helical spring 66 surrounds the elongate rod 60 and is sandwiched between a shoulder 68 formed on the elongate rod 60 and the side of an internal wall 70 formed within the fourth section 48. The spring 66 biases the elongate rod to its upper most position.

A first catch 72, with a chamfered edge 74, is formed on the top end of the rod 60. When the elongate rod 60 is in its uppermost position, the catch 72 passes through an aperture 73 formed in the outer top wall of the main housing 22 of the dust extractor and extends upwardly away from the main housing 22. When the elongate rod 60 is moved to its lowermost position, the catch 72 is withdrawn from aperture 73 into the main housing 22 so that none the first catch 72 is external of the main housing 22.

Second and third catches 76, 78 are mounted in parallel on the sides of the plate 62 remote from the elongate rod 60. The second and third catches 76, 78 each comprises chamfers 80, 82 and are of the same dimensions as each other. The second and third catches 76, 78 extend in the same direction and in parallel to the first catch 72. When the elongate rod 60 is in its uppermost position, the plate 60 moves to its upper most position with the catches 76, 78 passing through apertures 75 formed in the upper wall of the third section 46 and extends into the recess formed by the second section 44. When the elongate rod 60 is moved to its lowermost position, the plate 62 also moves to its lowest position, withdrawing the catches 76, 78 from apertures 75 and moving them inside of the third section 46 with neither of the second or third catches 76, 78 extending into the second section 44.

Extending horizontally from the sides of the plate 62 in a symmetrical fashion and in opposite directions, adjacent the elongate rod 60, are two arms 100, 102. Each arm 100, 102 extend through apertures 106 formed within the side walls of the main housing 22. A button 104 is attached to the end of each arm 100, 102 which is external of the main housing and accessible by an operator so that the operation can engage with the buttons 104 and move the buttons 104 up and down, which in turn, move the latch mechanism 38 up and down.

Mounted in the plate 62, between the second and third catches 76, 78, is a bearing 84.

Mounted in a slideable manner within the top end of the tubular spindle 50 for the fan wheel 40 is a drive spindle 86 having torx connection at its top end. The drive spindle 86 can axially slide within the tubular spindle 50 but is rotationally fixed to the tubular spindle 50 such that rotation of the tubular spindle 50 results in rotation drive spindle 86. A helical spring 200 is located inside of the tubular spindle 50 and is sandwiched between an inner base wall of the tubular spindle 50 and lower end of the drive spindle 86. The spring 200 urges the drive spindle 86 upwardly, out of the tubular spindle 50. The drive spindle 86 extends from the tubular spindle 50 and passes through the bearing 84 in the plate 62. The bearing 84 limits the upward movement of the drive spindle 86 due to a shoulder 202 formed on the drive spindle 86 engaging with the underside of the bearing 84. When the plate 62 and bearing 84 moves up and down, as the elongate rod 60 slides up and down, the drive spindle 86 also moves up and down due to the biasing force of the spring 200 urging the drive spindle 86 upwardly towards the position of the bearing 84, which limits the drive spindle's 86 upward movement.

Therefore, as the plate 60 moves up and down, the bearing 84 and drive spindle 86 both move up and down with the plate 60. When the plate 60 is in its uppermost position, the upper end of the drive spindle 86 is able to extend into the recess formed by the second section 44. When the plate 62 also moves to its lowest position, it moves the bearing 84 and hence the drive spindle 86 downwardly, withdrawing the drive spindle from the second section 44 and into the third section 46 with none of the drive spindle 86 extending into the second section 44.

Formed on each side of the motor housing 12 is a rib 206. The underside wall 208 of the motor housing 12 is flat with the edges 210 being curved to meet the side wall of the motor housing 12. Formed symmetrically on the underside wall 208 of the motor housing 12 are two recesses 212. An aperture 214, located between the two recesses 212, is formed through the centre of the underside wall 208. Located inside of the motor housing 12 adjacent the aperture is a socket 216 which is rigidly mounted on the end of the output spindle 242 of the electric motor 240 of the hammer drill. The socket 216 has a torx profile. The entrance to the socket 216 faces the aperture 214 so that the insertion of the drive spindle 86 into and through the aperture 214 would engage with the socket 216. Formed on the underside of the transmission housing 10 is a third recess 218. Forward of the third recess 218 is an inclined surface 220.

In order to mount the dust extractor onto the hammer drill, the front of the motor housing 12 is slid into the recess formed by the second section 44 of the main housing 22 of the dust extractor. As motor housing 12 enters the recess, the two ribs 206 engage with two walls 222 formed inside of the recess. The ribs 206 slide along the walls 22 and acts to guide the motor housing 12 inside of the recess. The sliding movement of the hammer drill into the recess is in a direction parallel to the axis of rotation A of the tool holder 14.

As the motor housing 12 enters the recess, the chamfered edge 74 of the first catch 72 engages with the inclined surface 222 on the underside of the transmission housing 10. The chamfered edges 80, 82 of the second and third catches 76, 78 engage with the rounded edges 210 of the underside wall 208 of the motor housing 12. As the motor housing 12 continues to enter the recess, the sliding movement of chamfered edges 74, 80, 82 over the inclined surface 220 and rounded edges 210 causes the three catches 72, 76, 78, and hence the whole latch mechanism 38, to be pushed downwardly inside of the main housing 22 of the dust extractor. As the latch mechanism 38 is pushed downwardly, the latch mechanism 38 moves downwardly against the biasing force of the spring 66. In addition, the movement of the latch mechanism 38 also results in the drive spindle 86 being moved downwardly, out of the recess and into the tubular spindle 50 against the biasing force of the spring 200 in the tubular spindle 50. As such, the latch mechanism 38 and drive spindle 86 are moved out of the way motor and transmission housings 10, 12 of the hammer drill and therefore the motor housing 12 can freely enter the recess.

When the motor housing 12 is fully inserted into the recess formed by the second section 44, the first catch 72 aligns with the recess 218 underneath the transmission housing 10. The second and third catches 76, 78 align with the two recesses 212 formed in the underside wall 208 of the motor housing 12. Therefore, the catches 72, 76, 78 can able to move into the recesses 212, 218. The spring 66 urges the latch mechanism 38 upwardly, causing the catches 72, 76, 78 to engage with the recesses 212, 218. When the catches 72, 76, 78 are engaged in the recesses 212, 218 and held there by the spring 66, the dust extractor is locked onto the hammer drill. When the latch mechanism 38 moves upwardly, the drive spindle 86 also moves upwardly towards the underside wall 208 of the motor housing 12. When the motor housing 12 is fully inserted into the recess formed by the second section 44, the aperture 214 formed through the underside wall 208 is aligned with the drive spindle 86. As such, the drive spindle 86 enters the aperture 214 and passes through the aperture 214 to engage with the socket 216. When the drive spindle 86 is engagement with the socket 216, rotation of the motor spindle results in rotation of the drive spindle 86, which in turn rotatingly drive tubular spindle 50 and hence the fan wheel 40. This creates a suction force to operate the dust extractor. In the event that the torx profile of the drive spindle 86 is not aligned with the torx profile of the socket 216, the drive spindle 86 will engage the end of the socket 216 and be prevented from further upward movement. However, the latch mechanism 38 is able to continue to rise to fully engage the catches 72, 76, 78 in the recesses 212, 218, the relative movement between the drive spindle 86 and latch mechanism 38 being accommodated by the compression of the spring 200 within tubular spindle 50. When the motor of the hammer drill is activated, the torx profile of the drive spindle 86 and that of the socket 216 will become aligned. Once aligned, the spring 200 in the tubular spindle 50 will push the drive spindle 86 upwardly, causing the end of the drive spindle 86 to engage with socket 216 so that the drive spindle 86 becomes drivingly engaged with the spindle of the motor.

Once the dust extractor is attached to the hammer drill and the drive spindle 86 is drivingly engaged with the motor spindle, the operation of the hammer drill will result in the automatic operation of the dust extractor. The space occupied by the hammer drill when it is attached to the dust extractor is referred to as the engagement region. In the present embodiment it includes, but is not limited to, the space formed by the recess formed by the second section 44 of the dust extractor and the area above the top wall of the main hosing where the first catch 72 is capable of extending.

The use of the chamfers 74, 80, 82 on the catches 72, 76, 78 allows the automatic movement of the latch 38 to move the catches 72, 76, 78 out the way of the hammer drill when the hammer drill is brought into engagement with the dust extractor. This allows the operator to simply push the dust extractor onto the hammer drill with no addition actions by the operator being required to engage the dust extractor with the hammer drill.

In order to release the dust extractor from the hammer drill, the operator slides the two buttons 104 downwardly on the main housing 22 the of the dust extractor. This moves the latch mechanism 38 downwardly against the biasing force of the spring 66. This results in the catches 72, 76, 78 disengaging from the recesses. As the latch mechanism 38 moves downward, it also results in the drive spindle 86 moving downwardly against the biasing force the spring 200 in the tubular spindle 50. As such the drive spindle 86 disengages with the socket 216 and is withdrawn from the aperture 214 in the underside wall 208 of the motor housing 12. As such, the motor housing can be freely slid out of the recess formed by the second section 44 of the dust extractor, separating the two from each other.

Two embodiments of an adaptor in accordance with the present invention will now be described with reference to FIGS. 8 to 21. Where the same features are used in the embodiments that used in the second example described with reference to FIGS. 2 to 7, the same reference numbers have been used. The adaptor has been added to enable the dust extractor to be used with a range of hammer drills.

Figure 8:
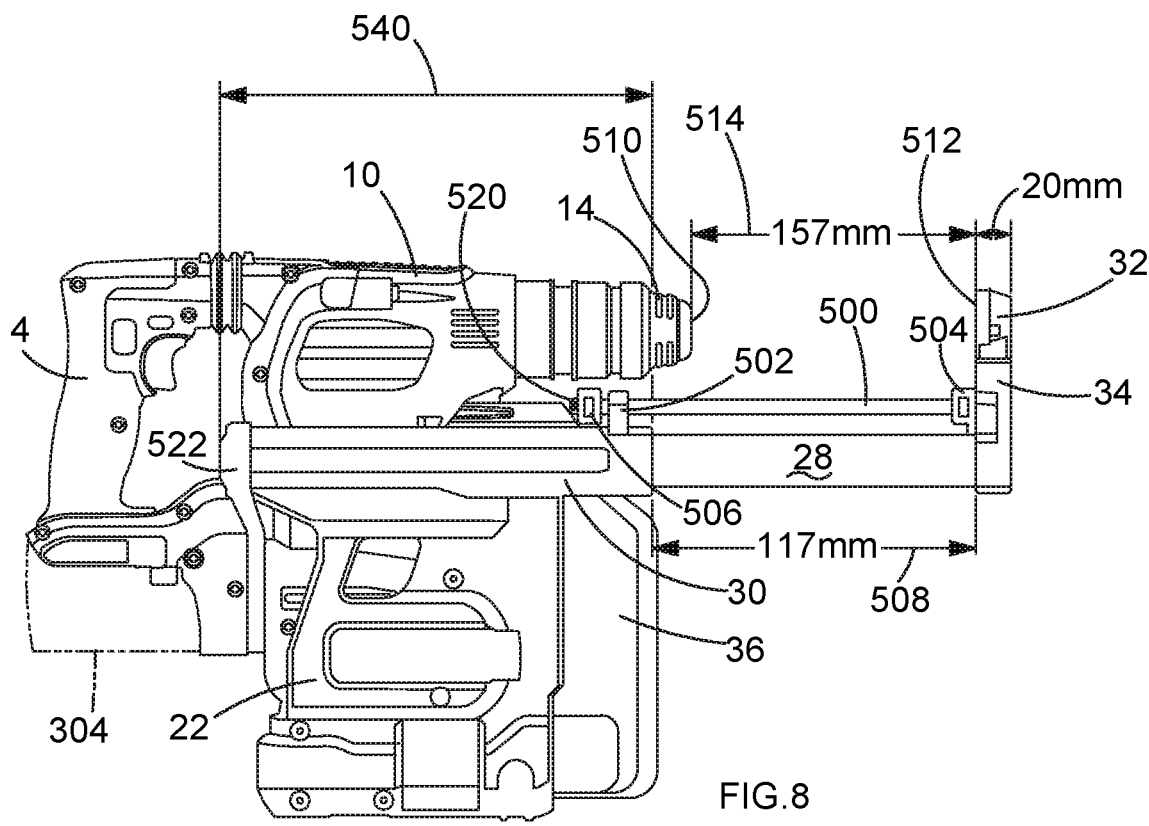
FIG. 8 shows a side view of a dust extractor attached to a first design of hammer drill powered by a battery.
Figure 9:
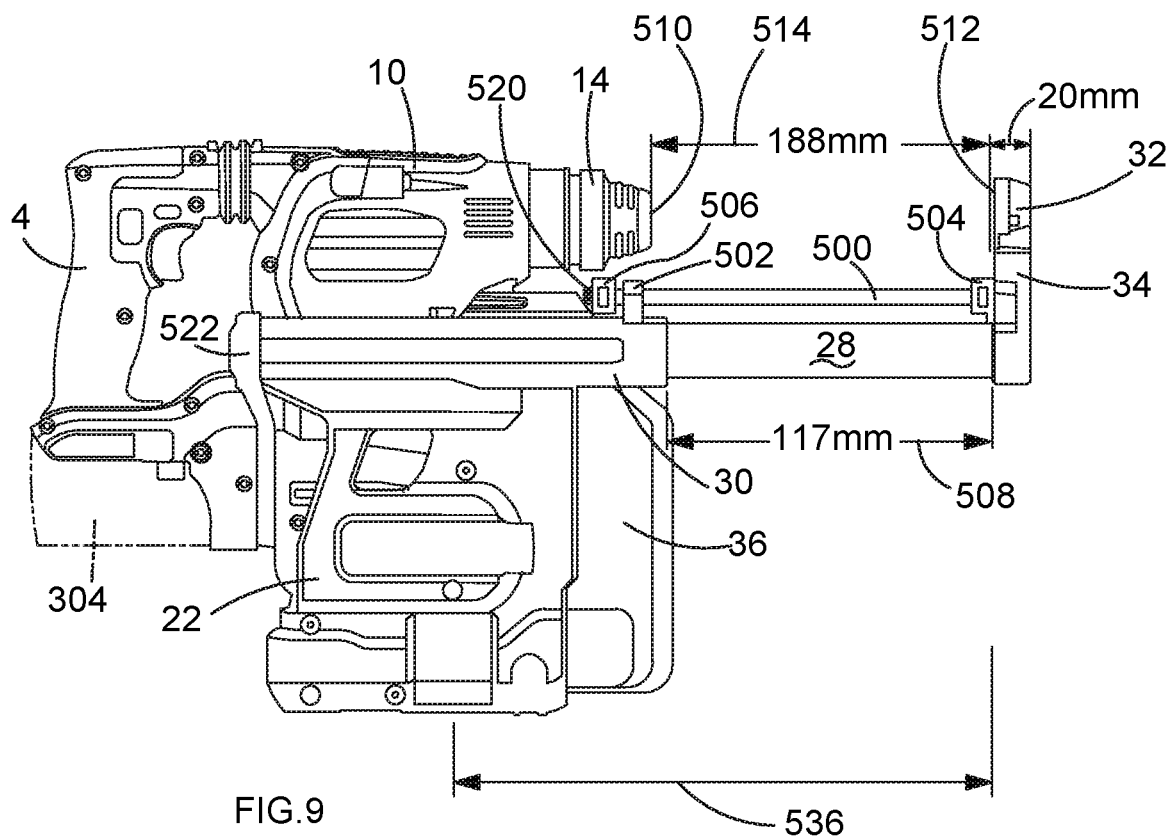
FIG. 9 shows a side view of the dust extractor shown in FIG. 8 attached to a second design of hammer drill powered by a battery.
Figure 10:
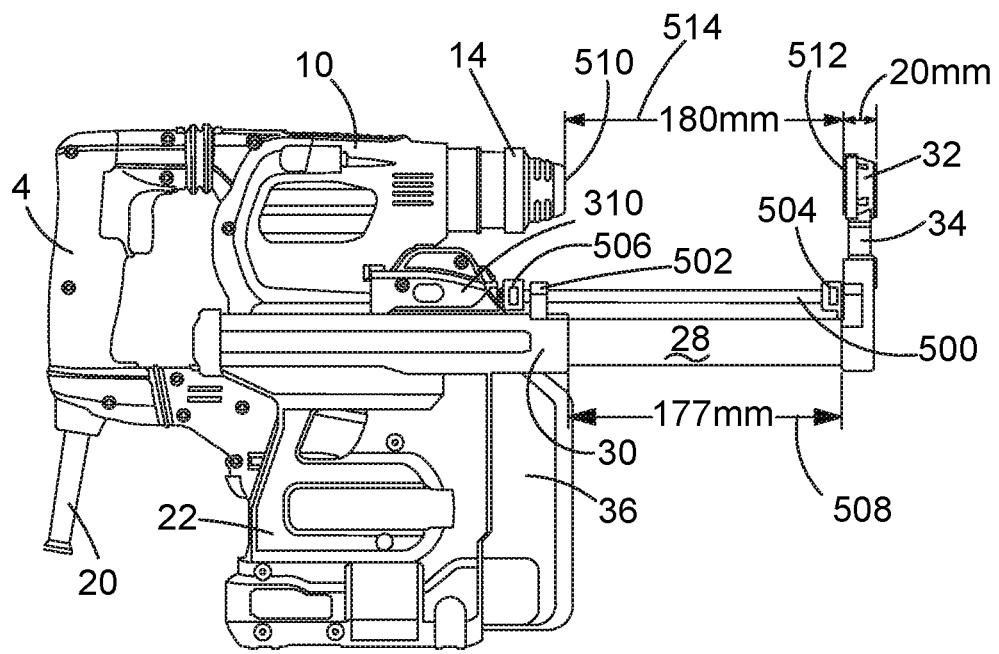
FIG. 10 shows a side view of a dust extractor shown in FIG. 8 attached to a third design of hammer drill powered by mains electricity using an adaptor in accordance with the present invention.
Figure 11:
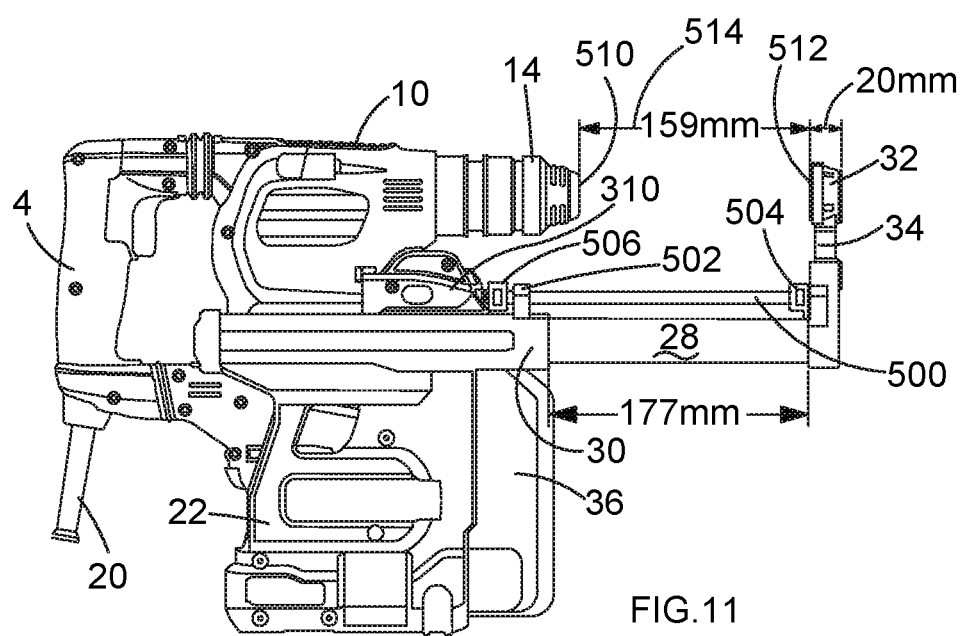
FIG. 11 shows a side view of a dust extractor shown in FIG. 8 attached to a fourth design of hammer drill powered by mains electricity using an adaptor in accordance with the present invention.
Figure 12:
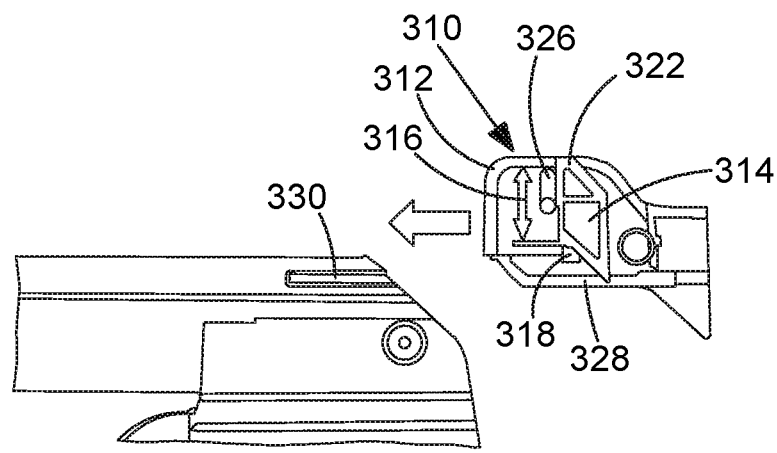
FIG. 12 shows a vertical cross section of a first embodiment of an adapter being fitted to the main housing of the dust extractor.
Figure 13:
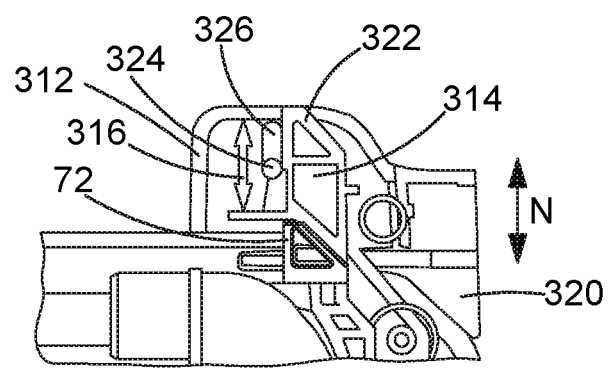
FIG. 13 shows a vertical cross section of the adapter mounted to the main housing of the dust extractor.
Figure 14:
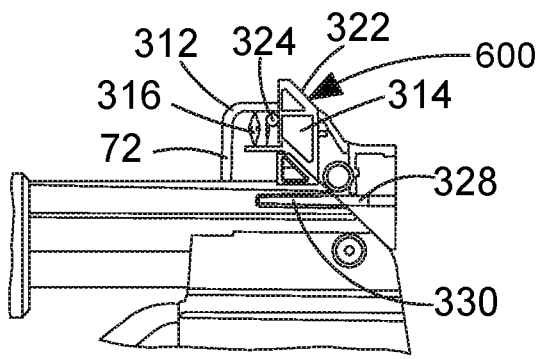
FIG. 14 shows a vertical cross section of the adapter mounted to the main housing of the dust extractor with the catch of the adaptor in its raised position.
Figure 15:
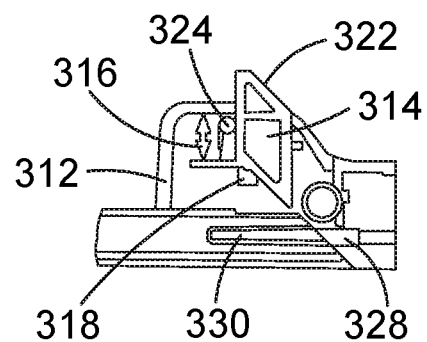
FIG. 15 shows a second view of a vertical cross section of the adapter mounted to the main housing of the dust extractor.
Figure 16:
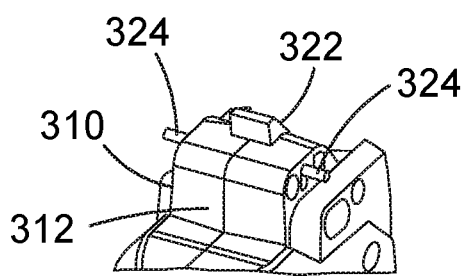
FIG. 16 shows a perspective view of the adapter mounted to the main housing of the dust extractor.
Figure 17:
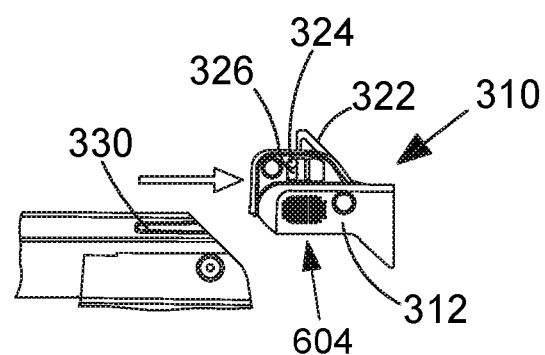
FIG. 17 shows a side view the adapter being removed from the main housing of the dust extractor.
Figure 18:
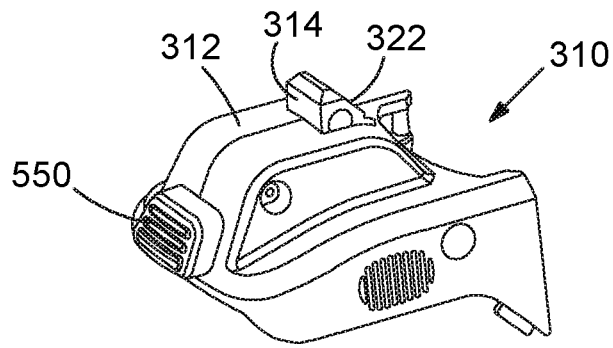
FIG. 18 shows a perspective view of a second embodiment of the adapter.
Figure 19:
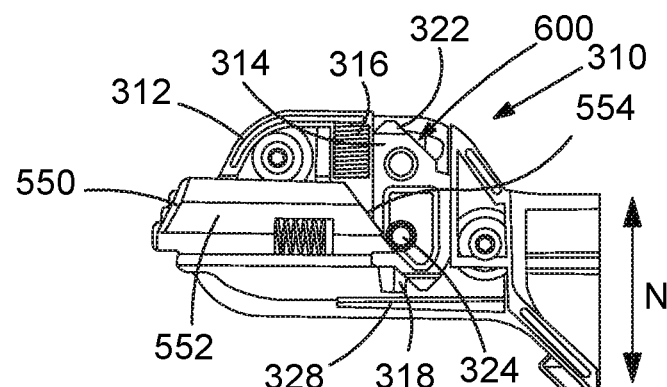
FIG. 19 shows a vertical cross section of the second embodiment of the adapter in an unlocked position.
Figure 20:
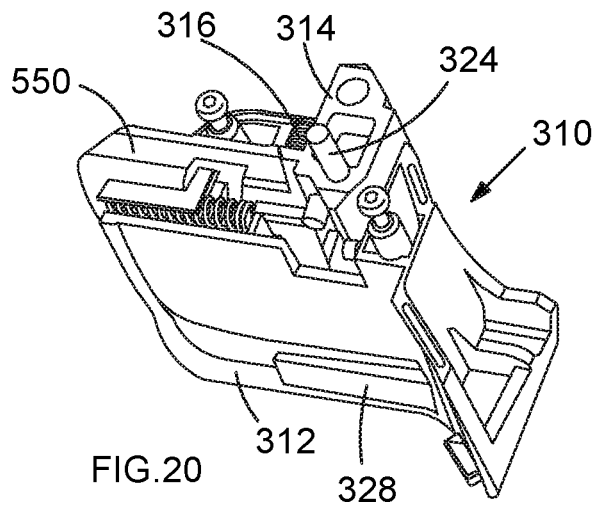
FIG. 20 shows a cut away perspective view of the adaptor.
Figure 21:
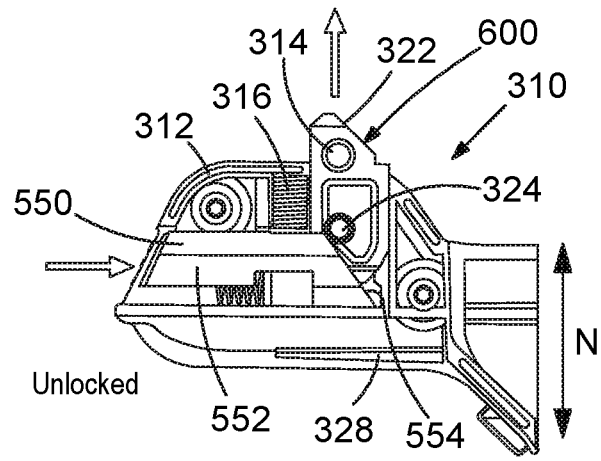
FIG. 21 shows a vertical cross section of the second embodiment of the adapter in a locked position.

The dust extractors shown in FIGS. 8 to 11 are identical in design (except for the addition of a recess 320 formed in the end of the catch 72) and function in the same manner as the dust extractor described above with reference to FIGS. 2 to 7. However, in each of the figures, the dust extractor is mounted on a different design of hammer drill. In FIGS. 8 and 9, the hammer drill is powered by a battery pack 304 (shown in dashed lines) which connects to the base of the rear handle 4. In FIGS. 10 and 11, the hammer drill is powered via an electric cable 20, which connects to the base of the rear handle 4 by which a mains AC electric power supply is supplied to the hammer drill. The electric motors 240 in each of the battery powered hammer drills have a different stack length to the motors 240 in the mains powered hammer drills resulting the length of the motor housings 12 being different for each hammer. In order for the dust extractor to attach to the hammer drill, the first catch 72 has to engage with a recess 218 on the transmission housing 10. If the length of the motor housing 12 varies, then the position (vertically) of the transmission housing 10 from the base of the motor housing 12 will vary resulting in the position of recess 218 altering relative to the base of the motor housing 12. However, as the design of dust extractor remains fixed, the range of positions of the catch 72 will remain the same.

In order to accommodate the different lengths of motor housing 12 on the mains powered hammer drills, an adapter 310 will be used. A first design of the adapter 310 will now be described with reference to FIGS. 12 to 17.

FIGS. 12 to 17 show a vertical cross section of a first embodiment of an adaptor 310. The adapter 310 comprises a housing 312 in which is mounted a catch 314. The catch 314 is capable of sliding vertically (in the direction of Arrow N) within the housing 312 between a first position where a first top end (322) projects through a first aperture 602 formed in the top of the housing and a second position where the first end 322 is located inside of the housing (312) (alternatively it could be designed so that the first end 322 is flush with the housing). A second aperture 604 is formed in the bottom of the housing (312) through which the second lower end of the catch (314) can be accessed. A spring 316 (shown as an arrow) biases the 314 catch to its lowest position. An engagement pin 318 formed on the base of the catch 314 projects vertically downwardly. Formed on the top of the first catch 72 of the dust extractor is a recess 320 which is capable of receiving the engagement pin 318. The top 322 of the catch 314 is the same shape as the top of the first catch 72 of the dust extractor and comprises a chamfer 600. Two release pins 324, integrally formed with the catch 314, extend sideways, horizontally, and in opposite directions from the catch 314, each extending through a vertical elongate slot 326 formed through the side wall of the housing 312. Rails 328 are formed on the base of the housing 312. Formed on the top of the main housing 22 of the dust extractor are guides 330 which are capable of receiving the rails 328 to connect the adaptor to the dust extractor.

To attach the adapter, a part of the adaptor is moved into the engagement area so that the rails 328 can engage with the guide 330. The rails 328 are slid into and along the guides 330. The engagement pin 318 engages the chamfer 74 of the first catch 72 causing the catch 314 to move upwards against the biasing force of the spring 316 (which is weaker than the spring 66 in the dust extractor). When the engagement pin 318 aligns with the recess 320, the engagement pin 318 enters into the recess 320 under the biasing force of the spring 316. The adapter 310 is then locked onto the dust extractor. The catch 314 moves with the first catch 72, the spring 316 ensuring the catch 314 and the first catch 72 remain in contact with each other. The top 322 of the catch is then used to engage the recess 218 of the transmission housing 10, the top 322 engaging and disengaging the recess 218 by movement of the first catch 72 as described in the patent specification.

To remove the adapter from the dust extractor, the catch 314 is moved upwards within the housing 312 against the biasing force of the spring 316 by the operator engaging the release pins 324 and sliding them vertically upwards within the slots 326 against the biasing force of the spring 316. This disengages the engagement pin 318 from the recess 320 of the first catch 72. The adapter can then be slid along the dust extractor until the rails 328 disengage with the guides 330 and the adaptor removed from the engagement area.

A second embodiment of the adaptor will now be described with reference to FIGS. 18 to 21. Where the same features are used in the second embodiment of adaptor that are used in the first embodiment described with reference to FIGS. 12 to 17, the same reference numbers have been used. The embodiment of the present invention is the same as that in the first embodiment except that a release button 550 has been added.

In the first embodiment, the two release pins 324 extend sideways, horizontally, and in opposite directions from the catch 314, each extending through a vertical elongate slot 326 formed through the side wall of the housing 312. In the second embodiment, there is only one release pin 324, which extends sideways, horizontally, from the catch 314, into a chamber formed inside of the housing 312.

The release button 550 comprises a bar 552 which can slide can slide horizontally (perpendicular to the catch 314) inside of the housing 312, the first end 554 of which extends into the chamber. The first end 554 is angled to form a chamfer. The second opposite end of the bar 552 forms the release button 550. The bar 552 can slide from a first position (shown in FIGS. 20 and 21) where the button 550 extends through an aperture formed through a wall of the housing 512 to a second position (shown in FIG. 23) where the button 550 is flush with (or even inside of) the housing 312. When the bar 552 is in its first position, the end 554 is located adjacent to the pin 324. When the bar is in its first position the adaptor can be mounted on the dust extractor as described in relation to the first embodiment. In order to remove the adaptor from the dust extractor, the release button 550 is depressed. Depression of the release button causes the bar 552 to move towards its second position. As the bar 552 is moved from its first position to its second position, the end 554 engages with the pin 324 and causes it to side along its angle surface causing it to move upwardly, the end 554 acting as a cam, the pin 324 acting as a cam follower. As the pin 324 moves upwardly, the catch 314 also moves upwardly against the biasing force of the spring 316. This causes the pin 318 to become disengaged from the recess 320 of the first catch 72 of the dust extractor. The adapter can then be slid of the dust extractor until the rails 328 disengage with the guides 330 and the whole of the adaptor leaves the engagement area. The bar 552 is biased towards its first position by a spring 556.

The description of the above embodiments of the adaptor is in relation to the adaptors being used with the first catch 72 of the dust extractor. This enables the dust extractor to be used on a hammer drill with a motor housing having an increased length. However, the reader will appreciate that such an adapter, within the scope of the present invention, could be used on the second and third catches 76, 78 of the dust extractor so that the dust extractor can be used on a hammer drill with a motor housing having a decreased length.

Whilst the embodiment of present invention has been described in relation to a hammer drill, it will be appreciated that the scope of the invention could include any type of drill.

The invention claimed is:

1. An adaptor for a dust extractor comprising:
a housing having a top portion and a bottom portion;
a first aperture formed in the top portion of the housing;
a second aperture formed in the bottom portion of the housing;
an adaptor catch having a first end and a second end, the adaptor catch being vertically slidable within the housing between a first catch position, where the first end projects through the first aperture, and a second catch position, where the first end is located flush with or inside of the housing, the second end of the adaptor catch being accessible through the second aperture;
a first biasing mechanism arranged to bias the adaptor catch towards the second catch position; and
an engagement pin formed on the second end of the adaptor catch and being engageable with a recess formed within a top portion of a catch of the dust extractor.

2. An adaptor according claim 1, further comprising at least one rail formed on the underside of the housing and being slidingly engageable with at least one guide formed on the dust extractor.

3. An adaptor for a dust extractor comprising:
a housing having a top portion and a bottom portion;
a first aperture formed in the top portion of the housing;
a second aperture formed in the bottom portion of the housing;
an adaptor catch having a first end and a second end, the adaptor catch being vertically slidable within the housing between a first catch position, where the first end projects through the first aperture, and a second catch position, where the first end is located flush with or inside of the housing, the second end of the adaptor catch being accessible through the second aperture;
a first biasing mechanism arranged to bias the adaptor catch towards the second catch position; and
a pin formed on a side of the adaptor catch extending away from the adaptor catch.

4. An adaptor according to claim 3, wherein the pin extends perpendicularly away from the adaptor catch.

5. An adaptor according to claim 4, wherein the pin extends through an elongate vertical slot formed through a side wall of the housing where it is accessible by a user.

6. An adaptor according to claim 3, wherein the pin extends away from the adaptor catch into a chamber, the adaptor further comprising:

a bar having a first end and a second end, the bar being slidable between a first bar position, where the first end of the bar is located away from the pin, and a second bar position, where the first end of the bar extends into the chamber and into engagement with the pin; and
a cam formed on the first end of the bar, the cam being engageable with the pin;
wherein, as the bar is moved from the first bar position to the second bar position, the cam engages the pin and moves the adaptor catch from the second catch position to the first catch position.

7. An adaptor according to claim 6, wherein the bar is slidable in a direction perpendicular to that of the adaptor catch.

8. An adaptor according to claim 6, further comprising a second biasing mechanism which biases the bar to the first bar position.

9. An adaptor according to claim 6, wherein the second end of the bar projects through an aperture formed through a wall of the housing, where it is accessible by a user, when the bar is in the first bar position.

10. An adaptor according to claim 9, wherein the second end of the bar is flush with or located inside of the housing surrounding the aperture formed through the wall of the housing when the bar is in the second bar position.

11. An apparatus comprising a dust extractor and an adaptor according to claim 1,
wherein the adaptor comprises:
a housing having a top portion and a bottom portion;
a first aperture formed in the top portion of the housing;
a second aperture formed in the bottom portion of the housing;
an adaptor catch having a first end and a second end, the adaptor catch being vertically slidable within the housing between a first catch position, where the first end projects through the first aperture, and a second catch position, where the first end is located flush with or inside of the housing, the second end of the adaptor catch being accessible through the second aperture; and
a first biasing mechanism arranged to bias the adaptor catch towards the second catch position;
and where the dust extractor comprises:
a dust extractor housing having an engagement region for receiving at least part of the housing of the adaptor when the adaptor is connected to the dust extractor; and
a latch mechanism comprising:
a latch moveably mounted within the dust extractor housing and moveable between a first latch position and a second latch position;
a biasing mechanism biasing the latch towards the first latch position; and
at least one dust extractor catch attached to the latch, wherein, when the latch is in the first latch position, the dust extractor catch projects the engagement region and, when the latch is in the second latch position, the dust extractor catch is located outside of engagement region;
wherein the at least one dust extractor catch comprises a chamfer that is arranged so that, when the latch is in the first latch position and a part of the adaptor enters the engagement region for connection to the dust extractor, the chamfer sliding engages the second end of the adaptor catch and moves the adaptor catch from the second catch position towards the first catch position against the biasing force of the first biasing mechanism.

12. An apparatus according to claim 11, wherein, when the adaptor is connected to the dust extractor, the chamfer sliding remains drivingly engaged with the second end of the adaptor catch.

13. An apparatus according to claim 11, wherein, when the adaptor is connected to the dust extractor, movement of the latch from the first latch position to the second latch position moves the adaptor catch from the first catch position to the second catch position.

14. An apparatus according to claim 11, wherein a recess is formed in a tip of the at least one dust extractor catch; and
wherein the adaptor catch comprises an engagement pin formed on the second end of the adaptor catch engaging with the recess when the chamfer slidingly engages the second end of the adaptor catch.

15. An apparatus according to claim 11, wherein the engagement region comprises a recess formed within a section formed within the dust extractor housing and/or a space proximate and above a top wall of the dust extractor housing.

16. An apparatus according to claim 11, wherein the adaptor further comprises at least one rail formed on the underside of the housing and the dust extractor comprises at least one guide, and wherein, when the at least one part of the housing of the adaptor enters the engagement region, the at least one rail slidingly engages with the at least one guide to attach the adaptor to the dust extractor.

17. A system comprising a drill and an apparatus in accordance with claim 11, wherein the drill comprises:
an outer housing;
at least one recess formed in the outer housing arranged to receive the adaptor catch when the adaptor is connected to the dust extractor, the drill is mounted on the dust extractor, and the latch is in the first latch position.

18. A system according to claim 17, wherein the drill further comprises at least one surface engageable with a chamfer of the adaptor catch when the adaptor is connected to the dust extractor and the drill is moved into the engagement region.

* * * * *